(12) United States Patent
Tseng et al.

(10) Patent No.: US 8,222,333 B2
(45) Date of Patent: Jul. 17, 2012

(54) INTER-CROSSLINKED POLYMERIC MICROPARTICLES

(75) Inventors: Chi-Ming Tseng, Woodbury, MN (US); Jingjing Ma, Cottage Grove, MN (US); Paul Sedgwick, Roseville, MN (US); Peter B. Hall, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/937,480

(22) PCT Filed: Mar. 25, 2009

(86) PCT No.: PCT/US2009/038154
§ 371 (c)(1),
(2), (4) Date: Oct. 12, 2010

(87) PCT Pub. No.: WO2009/129033
PCT Pub. Date: Oct. 22, 2009

(65) Prior Publication Data
US 2011/0034624 A1    Feb. 10, 2011

Related U.S. Application Data

(60) Provisional application No. 61/046,117, filed on Apr. 18, 2008.

(51) Int. Cl.
*C08K 5/00*    (2006.01)
(52) U.S. Cl. ........ 524/236; 524/250; 524/253; 524/558; 525/78; 525/380; 525/381; 525/382

(58) Field of Classification Search ............... 525/78, 525/380, 381, 382; 524/236, 253, 250, 558
See application file for complete search history.

(56) References Cited

U.S. PATENT DOCUMENTS

| | | |
|---|---|---|
| 3,896,070 A | 7/1975 | Tummler et al. |
| 3,983,297 A | 9/1976 | Ono et al. |
| 4,418,120 A | 11/1983 | Kealy et al. |
| 4,569,960 A | 2/1986 | Blake |
| 5,136,000 A | 8/1992 | Luttenberger et al. |
| 5,508,313 A | 4/1996 | Delgado et al. |
| 5,512,612 A | 4/1996 | Brown et al. |
| 2002/0058754 A1 | 5/2002 | Engle et al. |

FOREIGN PATENT DOCUMENTS

| | | |
|---|---|---|
| EP | 0 473 148 | 3/1992 |
| JP | 03-152168 | 6/1991 |
| JP | 07-326957 | 12/1995 |
| JP | 08-316823 | 11/1996 |
| JP | 2001-101369 | 4/2001 |
| JP | 2003-055624 | 2/2003 |
| JP | 2007-224187 | 9/2007 |
| JP | 2008-037960 | 2/2008 |
| WO | WO01/95243 | 12/2001 |
| WO | WO02/084584 | 10/2002 |

OTHER PUBLICATIONS

Form PCT/ISA/210, International Search Report from WO 2009/129033, dated Jun. 24, 2009.

*Primary Examiner* — Peter D Mulcahy
(74) *Attorney, Agent, or Firm* — Dena M. Ehrich

(57) ABSTRACT

Adhesives containing inter-crosslinked polymeric microparticles are described. The polymeric microparticles include an acrylic polymer. The present disclosure also relates to water-based emulsions containing polymeric microparticles and a suitable inter-crosslinking agent as well as methods of making adhesives from such water-based emulsions.

20 Claims, No Drawings

INTER-CROSSLINKED POLYMERIC MICROPARTICLES

CROSS REFERENCE TO RELATED APPLICATIONS

This application is a national stage filing under 35 U.S.C. 371 of PCT/US2009/038154, filed Mar. 25, 2009, which claims priority to U.S. Provisional Application No. 61/046,117, filed Apr. 18, 2008, the disclosure of which is incorporated by reference in its/their entirety herein.

FIELD

The present disclosure relates to adhesives containing inter-crosslinked polymeric microparticles, including water-dispersible, pressure sensitive adhesives. The polymeric microparticles include an acrylic polymer that may be intra-crosslinked. The present disclosure also relates to water-based emulsions containing polymeric microparticles and a suitable inter-crosslinking agent as well as methods of making adhesives from such emulsions and adhesive articles incorporating such adhesives.

SUMMARY

Briefly, in one aspect, the present disclosure provides a water-based emulsion comprising polymeric microparticles, a multi-amine inter-crosslinking agent, and a neutralizer dispersed in water. The polymeric microparticles comprise the reaction product of a mixture of an alkyl (meth)acrylate; a vinyl carboxylic acid; a polyalkylene glycol (meth)acrylate functional oligomer; and a multi-functional crosslinking monomer. In some embodiments, the reaction product further comprises a copolymerized, ionic monomer, e.g., an ionic monomer comprising styrene sulfonate. In some embodiments, the water-based emulsion further comprises an additional inter-crosslinking agent, e.g., a polyamide-epichlorohydrin copolymer.

In some embodiments, the alkyl group of the alkyl (meth)acrylate has 4-8 carbon atoms, e.g., isooctyl acrylate or 2-ethyl-hexyl acrylate. In some embodiments, the vinyl carboxylic acid is selected from the group consisting of acrylic acid, methacrylic acid, itaconic acid, maleic acid, fumaric acid, and β-carboxyethylacrylate. In some embodiments, the reaction product further comprises at least one of (vi) one or more additional copolymerized alkyl (meth)acrylates and (vii) one or more additional copolymerized vinyl carboxylic acids. In some embodiments, the reaction product further comprises one or more additional copolymerized monomers, e.g., acrylamide, N-vinylpyrrolidone, N-vinylcaprolactam, and a monoester of a (meth)acrylic acid with an alcohol.

In some embodiments, the (meth)acrylate functional oligomer comprises a polyalkylene glycol (meth)acrylate, e.g., a hydroxy polyalkylene glycol or an alkoxy polyalkylene glycol.

In some embodiments, the multi-functional crosslinking monomer is an alkyl polyol polyacrylate. In some embodiments, the multi-functional crosslinking monomer is a multi-amine, e.g., a diamine or a triamine. In some embodiments, the multi-amine inter-crosslinking agent comprises a polyoxyalkylene amine.

In some embodiments, the water-based emulsion further comprises a polymerization surfactant, e.g., an ethoxylate. In some embodiments, the neutralizer comprises potassium hydroxide.

In some embodiments, the mixture independently comprises 60% to 80% alkyl (meth)acrylate, 8% to 12% vinyl carboxylic acid, 15% to 22% polyalkylene glycol (meth)acrylate functional oligomer, 0.01 to 0.05% multi-functional crosslinking monomer. In some embodiments, the emulsion comprises 5 to 20 parts by weight of multi-amine inter-crosslinking agent per 100 parts polymeric microparticles.

In another aspect, the present disclosure provides an adhesive comprising polymeric microparticles inter-crosslinked by a multi-amine inter-crosslinking agent. The polymeric microparticles comprise the reaction product of a mixture of an alkyl (meth)acrylate; a vinyl carboxylic acid; a polyalkylene glycol (meth)acrylate functional oligomer; a multi-functional crosslinking monomer, and optionally a copolymerized, ionic monomer. In some embodiments, the mixture comprises 60% to 80% alkyl (meth)acrylate, 8% to 12% vinyl carboxylic acid, 15% to 22% polyalkylene glycol (meth)acrylate functional oligomer, 0.01 to 0.05% multi-functional crosslinking monomer.

In some embodiments, the adhesive comprises 5 to 20 parts by weight of multi-amine inter-crosslinking agent per 100 parts polymeric microparticles. In some embodiments, the alkyl group of the alkyl (meth)acrylate contains 4-8 carbon atoms; and the vinyl carboxylic acid is selected from the group consisting of acrylic acid, methacrylic acid, itaconic acid, maleic acid, fumaric acid, and β-carboxyethylacrylate. In some embodiments, the reaction product further comprises one or more additional copolymerized monomers selected from the group consisting of one or more additional copolymerized alkyl (meth)acrylates; one or more additional copolymerized vinyl carboxylic acids; acrylamide, N-vinylpyrrolidone, N-vinylcaprolactam, a monoester of a (meth)acrylic acid with an alcohol; and combinations thereof.

In some embodiments, the (meth)acrylate functional oligomer comprises a polyalkylene glycol (meth)acrylate. In some embodiments, the multi-functional crosslinking monomer is an alkyl polyol polyacrylate. In some embodiments, the multi-amine inter-crosslinking agent comprises a diamine or a triamine. In some embodiments, the multi-amine inter-crosslinking agent comprises a polyoxyalkylene amine.

In some embodiments, the adhesive is water-dispersible.

In another aspect, the present disclosure provides a method of forming an adhesive article comprising coating the water-based emulsion according to any of the various embodiments of the present disclosure on a substrate; drying the emulsion; and inter-crosslinking the polymeric microparticles with the multi-amine inter-crosslinking agent.

In yet another aspect, the present disclosure provides an adhesive article comprising a substrate and an adhesive according to any one of the various embodiments of the present disclosure bonded to the substrate. In some embodiments, the substrate comprises water-dispersible fibers.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

As used herein, "polymeric microparticle" refers to a microparticle comprising one or more polymer chains. In some embodiments, the polymer chains within a particular microparticle may be "intra-crosslinked", i.e., crosslinking may occur among polymer chains within a single microparticle.

As used herein, "inter-crosslinked polymeric microparticle" refers to a polymeric microparticle crosslinked to one or more other polymeric microparticles. A given polymeric microparticle may be both intra-crosslinked and inter-crosslinked.

As used herein, "(meth)acrylate" refers to an acrylate and/or methacrylate. For example, butyl (meth)acrylate refers to butyl acrylate and/or butyl methacrylate.

As used herein, the term "water-dispersible" means that the respective composition has a grade of no more than 2 in the "water-dispersibility test," described hereinafter.

As used herein, all percentages and parts are by weight unless otherwise indicated.

Generally, the water-based emulsions of the present disclosure comprise polymeric microparticles. The microparticles comprise an intra-crosslinked acrylic polymer comprising the reaction product of an alkyl (meth)acrylate, a vinyl carboxylic acid, a polyalkylene glycol (meth)acrylate-functional oligomer, and a multi-functional crosslinking monomer. The resulting microparticles are inter-crosslinked by, e.g., a multi-amine inter-crosslinking agent.

Generally, any known alkyl (meth)acrylate or combination of alkyl (meth)acrylates may be used. In some embodiments, the alkyl group of at least one alkyl (meth)acrylate contains 1-8 carbon atoms. Generally, the water-dispersibility of an acrylic polymer may be inhibited by the presence of large amounts of higher molecular weight alkyl (meth)acrylates (i.e., alkyl (meth)acrylates having an alkyl group containing nine or more carbon atoms). In some embodiments, an acrylic polymer comprising greater than 80% by weight of an alkyl acrylate having an alkyl group containing nine or more carbon atoms may not be sufficiently water-dispersible. In some embodiments, an acrylic polymer comprising greater than 70% by weight of an alkyl acrylate having an alkyl group containing nine or more carbon atoms may not be sufficiently water-dispersible.

In some embodiments, the alkyl group of at least one alkyl (meth)acrylate has eight carbon atoms, e.g., isooctyl (meth)acrylate and/or 2-ethylhexyl (meth)acrylate. In some embodiments, the alkyl group of at least one alkyl (meth)acrylate contains 4-7 carbon atoms, and in some embodiments, 4 or 5 carbon atoms, e.g., butyl acrylate. In some embodiments, the alkyl group of at least one alkyl (meth)acrylate contains 1-2 carbon atoms, e.g., methyl acrylate and/or ethyl acrylate. In some embodiments, the acrylic polymer includes at least one alkyl (meth)acrylate having an alkyl group of eight carbon atoms and at least one additional alkyl (meth)acrylate having an alkyl group of 1-7 carbon atoms.

In some embodiments, the acrylic polymer comprises at least 50% by weight and in some embodiments, at least 60%, of at least one alkyl (meth)acrylate. In some embodiments, the acrylic polymer comprises no more than 90%, in some embodiments, no more than 85%, or even no more than 80% alkyl (meth)acrylates. In some embodiments, the acrylic polymer comprises 65% to 75% alkyl (meth)acrylates.

Exemplary vinyl carboxylic acids that may be useful in some embodiments of the present disclosure include acrylic acid, methacrylic acid, itaconic acid, maleic acid, fumaric acid, and β-carboxyethylacrylate. In some embodiments, the acrylic polymer comprises no more than 15% by weight, in some embodiments, no more than 12%, vinyl carboxylic acid. In some embodiments, the acrylic polymer comprises at least 5%, in some embodiments, at least 8%, vinyl carboxylic acid. In some embodiments, the acrylic polymer comprises 9-12% vinyl carboxylic acid.

Exemplary polyalkylene glycol (meth)acrylates that may be useful in some embodiments of the present disclosure include hydroxy and alkoxy (e.g., methoxy or ethoxy) polyalkylene glycol (meth)acrylates. In some embodiments, the polyalkylene may be selected from the group consisting of polyethylene, polypropylene, copolymerized ethylene and propylene, and combinations thereof. Specific polyalkylene glycol (meth)acrylates that may be useful in some embodiments of the present disclosure include hydroxy polypropylene glycol (meth)acrylate, methoxy polypropylene glycol (meth)acrylate, and methoxy polyethylene glycol (meth)acrylate.

In some embodiments, the acrylic polymer comprises less than 25% by weight, e.g., less than 22%, polyalkylene glycol (meth)acrylates. In some embodiments, the acrylic polymer comprises at least 5%, in some embodiments, at least 10%, or even at least 15%, polyalkylene glycol (meth)acrylates. In some embodiments, the acrylic polymer comprises 18-22% polyalkylene glycol (meth)acrylates.

The acrylic polymer further comprises a multifunctional crosslinking monomer co-reacted with the other monomers. Generally, a multifunctional crosslinking monomer includes at least two functional groups, each of which may be independently selected. In some embodiments, the multifunctional crosslinking monomer may be difunctional. In some embodiments, both functional groups may be the same functional group. In some embodiments, two different functional groups may be present.

Exemplary multifunctional crosslinking monomers include polyacrylates, including alkyl polyol polyacrylates such as alkyl diol diacrylates and alkyl triol triacrylates. Exemplary alkyl diol diacrylates suitable for some embodiments of the present disclosure include 1,4-butanediol diacrylate (BDDA) and 1,6-hexanediol diacrylate (HDDA). Exemplary alkyl triol triacrylates suitable for some embodiments of the present disclosure include trimethylol propanetriacrylate (TMPTA) and trimethylol propanetrimethacrylate (TMPTM). Other exemplary multifunctional crosslinking monomers include divinyl compounds such as divinyl benzene.

In some embodiments, the acrylic polymer comprises no greater than 0.05% by weight, in some embodiments, no greater than 0.04%, or even no greater than 0.03% of a multifunctional crosslinking monomer. In some embodiments, the acrylic polymer comprises at least 0.01%, or even at least 0.02% of a multifunctional crosslinking polymer.

In some embodiments, the acrylic polymer further comprises a copolymerized ionic monomer. In some embodiments, the ionic monomer comprises an inorganic cation and an organic anion. Exemplary inorganic cations include sodium ($Na^+$), potassium ($K^+$), and ammonium ($NH_4^+$). Exemplary organic anions include styrene sulfonate.

In some embodiments, the acrylic polymer comprises at least 1% by weight, and in some embodiments at least 1.3%, of a copolymerized ionic monomer. In some embodiments, the acrylic polymer comprises no greater than 3%, and in some embodiments no greater than 2% of a copolymerized ionic monomer.

In some embodiments, the acrylic polymer may include one or more additional copolymerized monomers. Exemplary additional monomers include monoesters of either acrylic acid or methacrylic acid with an alcohol such as, e.g., ethanol, 1-propanol, 2-propanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, ethylene glycol, propylene glycol, and the like. Other exemplary monomers include acrylamide, N-vinylpyrrolidone, N-vinylcaprolactam, and hydroxyalkyl (meth)acrylates, e.g., hydroxyethyl acrylate.

In some embodiments, the acrylic polymer comprises no greater than 25% by weight of one or more additional copolymerized monomers. In some embodiments, the acrylic polymer comprises no greater than 20%, no greater than 15%, no greater than 10%, no greater than 5%, and in some embodiments, no greater than 2%, or even no greater than 1% by weight of one or more additional copolymerized monomers.

Generally, a polymerization surfactant may be present during the formation of the polymeric microparticles. In some embodiments, the polymerization surfactant is an ethoxylate. Exemplary polymerization surfactants include nonylphenol ethoxylate, C12-C14 secondary alcohol ethoxylates, and combinations thereof.

The amount of surfactant used can depend on a variety of factors. Generally, at least 0.5% by weight surfactant is added based on the total weight of monomers. In some embodiments, 0.5 to 5%, or even 0.5% to 2% (e.g., about 1%) surfactant may be used.

Typically, the resulting microparticles include polymeric chains comprising the reaction product of the various monomers (i.e., the alkyl (meth)acrylate, the vinyl carboxylic acid, the polyalkylene glycol (meth)acrylate, the multifunctional crosslinking monomer, and any additional monomers including, e.g., ionic monomers). These polymer chains are intra-crosslinked within each microparticle via reactions involving the co-reacted multifunctional crosslinking monomer.

Generally, the microparticles have a volume-averaged particle size (determined, e.g., using a HORIBA LA-910 Particle Size Analyzer) of at least 1 micron, in some embodiments, at least 4 microns, or even at least 5 microns. In some embodiments, the microparticles have a volume-averaged particle size of no greater than 15 microns, e.g., no greater than 10 microns, no greater than 9 microns, no greater than 7 microns, or even no greater than 6 microns. In some embodiments, the microparticles have a volume-averaged particle size of 4 to 10 microns, e.g., 4 to 7 microns, 5 to 7 microns, or 5 to 6 microns.

In some embodiments, the polymeric microparticles are dispersed in water along with an inter-crosslinking agent. In some embodiments, the inter-crosslinking agent is a multi-amine inter-crosslinking agent. Exemplary multi-amine inter-crosslinking agents include diamines (e.g., N,N,N',N'-tetrakis(2-hydroxypropyl)ethylenediamine), tri-amines, and tetra-amines. In some embodiments, polyether amines, e.g., polyoxyalkylene amines (including diamines and triamines available from, e.g., Huntsman Corporation (The Woodlands, Tex.) under the trade name JEFFAMINE) may be used.

In some embodiments, the dispersion comprises at least 5 parts by weight inter-crosslinking agent per 100 parts of polymeric microparticles. In some embodiments, the dispersion comprises at least 8 parts by weight inter-crosslinking agent per 100 parts of polymeric microparticles. In some embodiments, the dispersion comprises no greater than 20 parts by weight, and in some embodiments, no greater than about 17 parts by weight inter-crosslinking agent per 100 parts of polymeric microparticles In some embodiments, the water-based dispersion also includes a neutralizer, such as an amine and/or an alkali metal hydroxide, to neutralize at least some of the acid groups of the acrylic polymer. In some embodiments, the neutralization not only improves the water-dispersibility of the adhesive, it also increases the cohesive strength of the adhesive composition. In some embodiments, a metal hydroxide (e.g., sodium and/or potassium hydroxide) may be used as a neutralizing agent. In some embodiments, ammonium compounds may be used as a neutralizing agent.

Generally, the amount of neutralizing agent added is selected to neutralize a desired fraction of the carboxylic acid groups of the microparticles. In some embodiments, sufficient amounts of a neutralizer may be added to neutralize at least 30% of the acids groups, in some embodiments, at least 40% of the acid groups.

In some embodiments, the cohesive strength of the adhesive can also be adjusted via the use of additional inter-crosslinking agents (e.g., a second inter-crosslinking agent in addition to the multi-amine inter-crosslinking agent). Any of several well known inter-crosslinking agents may be used, including bisamides, polyamide-epichlorohydrin compounds, and metal chelates (e.g., aluminum acetylacetonate). Additional exemplary inter-crosslinking agents include those disclosed in U.S. Pat. Nos. 4,418,120 (Kealy et al.) and 4,569,960 (Blake). Generally, the amount and type of the additional crosslinker is selected to impart cohesiveness up to a point where the water-dispersibility of the adhesive is not affected adversely. The amount of crosslinker added will also depend in part on the composition of the acrylic adhesive and the specific additional crosslinker(s) chosen, as may be determined by routine experimentation.

Tapes which include the adhesive compositions of the present disclosure may be provided without a backing (e.g., a transfer tape), or with a backing. If a backing is employed, it may be covered with adhesive on one side of the backing (i.e., a single-sided tape) or both sides of the backing (i.e., a double-sided tape).

In some embodiments, one or both an adhesive layers may be directly bonded to the backing. In some embodiments, one or both adhesive layers may be indirectly bonded to the backing, e.g., one or more layers may be interposed between the backing and an adhesive layer. In some embodiments, an adhesion-promoting layer may be interposed between the backing an adhesive layer. Generally, any known adhesion promoting layer (e.g., a primer) may be used. In some embodiments, the adhesion promoting layer is water-dispersible under the same conditions as the adhesive.

In some embodiments, an adhesive layer may comprise fibers. In some embodiments, the fibers may be water-dispersible under the same conditions as the adhesive composition, e.g., cellulose fibers and/or rayon fibers. In some embodiments, adhesive transfer tapes (e.g., adhesive layers without a backing) comprise fibers.

EXAMPLES

The following test methods were used to evaluate the various adhesives.

Imaging. The Imaging ("IM") test was used to evaluate the likelihood of a repulpable tape to cause visual defects and tears within paper jumbos. Three 2.5 centimeters (cm) (1.0 inch) square tape samples were placed between fourteen layers of test paper (62 grams/square meter (gsm) glossy "ADVOCATE PAPER" available from Verso Paper Company, Jay, Me.) measuring 10.2 cm by 5.1 cm (4 inches by 2 inches), with seven layers above and seven layers below the sample. After placement of the first layer of paper on each side of the tape sample, the stack was rubbed down with a 3M PA-1 Tape Wiper (available from 3M Company, St. Paul, Minn.) ensuring there were no air bubbles. The remaining layers of paper were then added. The paper layers were positioned so all had the same orientation (i.e., all paper layers were positioned with the wire side down) and aligned so that all layers covered the test squares. The stack of paper layers with the embedded tape sample was placed between two sets of two pieces of blotter stock (Ahlstrom Grade 2400002, White Pulp Test, 141 gsm, available from Ahlstrom Mount Holly Springs, Mount Holly Springs, Pa.) measuring 12.7 cm (5 inches) square. The sample stack, including the blotter stock, was placed between two silicone rubber pads, each having a thickness of approximately 0.32 cm (⅛ inches) and a Durometer hardness of 60 A (available as Plain Back Silicone Rubber Sheet, McMaster-Carr, Chicago, Ill.). This lay-up was placed in a preheated press (Automatic Hydraulic Press, Model 2824-1, available from Fred S. Carver, Incorporated, Menomonee Falls, Wis.) set at a temperature of 71° C. (160° F.) and a pressure of 618 kPa (90 psi) for four hours.

Upon removal from the press and removal of the silicone pads and blotter stock, the stack was allowed to cool to room temperature, after which each layer of test paper was carefully removed one by one, starting with the outermost layer for both sides of the sample stack, and placed in order on an illuminated light table. For purposes of the imaging test, the layers were visually evaluated from the center of the square area that had been positioned directly over each tape sample to outside edge of the paper layer for surface discoloration. In addition, the paper layer in direct contact with the adhesive surface (and the tape backing in the case of single coated tapes) was also evaluated. The total number of layers that exhibited surface discoloration was divided by two and the result reported under the heading "Imaging."

Blocking. In addition to evaluating "Imaging," the same paper layers were assessed for blocking using the following Blocking ("BL") test. The layers were numbered successively on each side of the stack starting with zero, i.e., the paper layer in direct contact with the adhesive was numbered "zero". In the case of single coated tapes, the numbering on one side started with the tape backing such the first paper layer in contact with, and separated from the adhesive layer by, the tape backing was numbered "one." Beginning with the outermost layer, each paper layer was peeled off. The first paper layer to exhibit any degree of adhesion to the next innermost layer was identified and this innermost layer number recorded. That is, if the fifth paper layer out from the adhesive layer (i.e., layer four) exhibited any degree of adhesion to the next (inner) paper layer (i.e., layer three) then a value of three was assigned. This was done on both sides of the stack. The largest number recorded for the stack was reported under the heading "Blocking."

Splice Adhesion Strength. The performance of a tape sample used to prepare a web splice was measured using the following Splice Adhesion Strength test, which is generally in accordance with the test method described in Pressure Sensitive Tape Council PSTC-131 (Rev 10/03) "Tensile Strength and Elongation of Pressure Sensitive Tapes". The test was run at 21° C. (70° F.) and 50% relative humidity (RH). The tape samples and paper strips used in each test were equilibrated for least thirty minutes at the test conditions prior to use.

A sample of a single coated pressure sensitive tape measuring 5 centimeters (cm) long by 2.5 cm wide was used to prepare a lengthwise butt splice between two paper strips measuring 20.3 cm long by 2.5 cm wide, with equal portions of the tape on each piece of paper. Two different paper stocks were tested, i.e., S20 White Copy Bond, 79 gsm, available from Georgia Pacific, Camas, Wash. ("Paper 1"); and MAC1 starch coated free sheet, 113 gsm, available from Boise Incorporated, International Falls, Minn. ("Paper 2").

For double coated pressure sensitive tape, tape and paper strips were conditioned in the same manner as above. Next, a tape sample measuring 2.5 cm square was used to prepare a lengthwise overlap splice between two paper strips each measuring 20.2 cm long by 2.5 cm wide, with equal portions of the paper on opposite sides of the tape sample.

For both the single and double coated tape spliced samples, each paper strip was separately reinforced by covering its entire backside with a piece of SCOTCH Filament Tape 893 (a single coated, pressure sensitive adhesive filament tape, available from 3M Company, St. Paul, Minn.) to give a spliced article. The spliced article was rolled down using a mechanical roll-down unit (Poweroll PR-100, obtained from Instrumentors, Incorporated, Strongsville, Ohio), having a 6.8 kilogram rubber roller, at a rate of 30.5 centimeters/minute to ensure intimate and consistent contact.

The spliced article was then immediately placed in the jaws of a tensile tester (Instron Universal Materials Testing Machine, Model 4465, Instron Corporation, Norwood, Mass.) and the splice adhesion was measured using the following parameters. The initial distance between jaws was 12.7 cm with no slack in the sample, the rate of jaw separation was 1.25 cm/min., and a load cell capacity of 91 kg (200 pounds). The breaking force was recorded. Three samples were evaluated and the average splice adhesion strength was reported in units of kiloNewtons per meter (kN/m).

90° Peel Adhesion Strength. The performance of some tape samples was measured using the following 90° Peel Adhesion Strength ("90° PAS") test, which is generally in accordance with the test method described in Pressure Sensitive Tape Council PSTC-101 method F (Rev 10/03) "Peel Adhesion of Pressure Sensitive Tape". The test was run at 21° C. (70° F.) and 50% relative humidity (RH).

The surface of a stainless steel test panel measuring 12.5 cm long by 5 cm wide was covered with a piece of 3M FLEXMOUNT Plate Mounting Tape 411☐L (a double coated pressure sensitive adhesive tape, available from 3M Company, St. Paul, Minn.) which was trimmed to the same dimensions. Next, a piece of the paper (S20 White Copy Bond) was applied to the mounting tape covering its entire surface and then trimmed to the same dimensions. A 3M PA-1 Tape Wiper was used to press down the paper to the tape and the tape to the panel simultaneously using firm hand pressure. After equilibrating both the test panel and a single coated pressure sensitive adhesive tape for least thirty minutes at the test conditions, a sample of the experimental tape measuring 30 cm long by 2.5 cm wide was folded onto itself (adhesive to adhesive) at one end to form a 1.2 cm long tab. The other end of the tape sample was placed in lengthwise contact with the exposed paper surface of test panel, with the adhesive in contact with the paper, and flush with one end of the panel. The tape sample was then rolled down using the mechanical roll-down unit adapted to have a 100 gram rubber roller, at a rate of 61 cm/min. The resulting test panel was then placed in a 90° angle test fixture on a peel adhesion tester (Slip/Peel Tester, Model 3M90, obtained from Instrumentors, Incorporated, Strongsville, Ohio). The tab end of the tape sample was secured in the clamps of the adhesion tester and the peel adhesion was measured at a peel rate of 30.5 cm/min. Three test panels were evaluated and the average peel force in Newtons per meter (N/m) was reported.

For double coated pressure sensitive adhesive tapes, which had a protective release liner on one adhesive surface, the exposed adhesive surface was covered with Kraft bag paper (Wausau Mosinee Paper 696-C, 61 lb (100 gsm), available from Wausau Mosinee, Mosinee, Wis.) and a 3M PA-1 Tape Wiper was used to press down the paper to the tape using firm hand pressure. The release liner was then removed and the resulting tape article employed as a single coated tape sample as described above.

Shear Time. The ability of a pressure sensitive adhesive tape to remain adhered to a substrate while under a constant load applied in a direction parallel to the surface of the tape and substrate, was evaluated using the Shear Time test, which is generally in accordance with the test method described in Pressure Sensitive Tape Council PSTC-107 Rev 10/03) "Shear Adhesion of Pressure Sensitive Tape", Procedure B. The surface of a stainless steel test panel measuring 10.2 cm long by 7.6 cm wide was covered with a piece of 3M FLEX-MOUNT Plate Mounting Tape 411 DL, which was trimmed to the same dimensions. Next, a piece of paper (S20 White Copy Bond) was applied to the exposed tape covering its entire surface and then trimmed to the same dimensions. A 3M PA-1 Tape Wiper was used to press down the paper to the tape and the tape to the panel simultaneously using firm hand pressure. The test panel and a sample of single coated pressure sensitive adhesive tape were both equilibrated at 21° C. (70° F.) and 50% relative humidity (RH).

Next, a sample of the experimental tape measuring 15.2 cm long by 2.54 cm wide was placed in lengthwise contact with the exposed paper surface on the test panel, with the adhesive in contact with the paper, such that there was more than 2.54 cm length of the tape on the panel and sufficient excess tape extending beyond the edge of the panel to form a loop. The tape sample was then rolled down twice in each direction using a mechanical roll-down unit having a 2 kilogram rubber roller, at a rate of 61 cm/min. to ensure intimate and consistent contact. Next, the tape section on the panel: was trimmed to exactly 2.54 cm in length. The excess tape extending beyond the edge of the panel was wrapped around a metal hook and then onto itself, adhesive to adhesive, and secured by stapling to secure the hook and provide the test sample. The test sample was immediately transferred to a fixture and positioned such that panel was disposed at an angle of 2 degrees to the vertical with the free end of the tape extended downward at an angle of 178 degrees to the test panel. A one kilogram weight was placed on the metal hook. The amount of time the sample remained on the test panel was recorded in minutes. The test was run at 21° C. (70° F.) and 50% relative humidity (RH). Three samples were evaluated and the average shear time in minutes was reported. In some cases, the test was terminated after 2800 minutes.

For double coated pressure sensitive adhesive tapes, which had a protective release liner on one adhesive surface, the exposed adhesive surface was covered with Kraft bag paper (Wausau Mosinee Paper 696-C, 61 lb (100 gsm), available from Wausau Mosinee, Mosinee, Wis.) and a 3M PA-1 Tape Wiper was used to press down the paper to the tape using firm hand pressure. The release liner was then removed and the resulting tape article employed as a single coated tape sample as described above.

300° F. Shear Time and Slippage. This test is a measure of the ability of a pressure sensitive adhesive tape to remain adhered to a substrate while under a constant load applied in a direction parallel to the surface of the tape and substrate at 300 degrees F. (149° C.).

A sample of a single coated pressure sensitive adhesive tape measuring 5 cm long by 2.5 cm wide was used to prepare a lengthwise butt splice between two paper strips (Mosinee Grade GX532012, 89 gsm, available from Wausau Mosinee, Rhinelander, Wis.) each measuring 20.3 cm long by 2.5 cm wide, with equal portions of the tape on each piece of paper. The spliced article was rolled down using a mechanical roll-down unit having a 6.8 kilogram rubber roller, at a rate of 30.5 cm/min. to ensure intimate and consistent contact. The spliced article was marked with a pencil on the paper strips at each end of the tape sample. Next, each end of the spliced article was folded over and stapled twice to provide an open loop at each end.

For double coated pressure sensitive tapes a tape sample measuring 2.5 cm square was used to prepare a lengthwise overlap splice between two paper strips (Mosinee Grade GX532012), each measuring 20.3 cm long by 2.5 cm wide, with equal portions of the paper on opposite sides of the tape sample to give a spliced article. The resulting spliced article was then rolled down, marked with a pencil, and provided with loops as described above for the single coated tape sample.

A timing stand and 1000 gram weights were preheated in a forced air oven to 300° F. (149° C.). The timing stand included a hanging rack and stop switches linked to a timer. The spliced articles were then suspended from the timing stand by means of a brass hook placed through the loop at one end and a 1000 gram weight hung from the article by means of the loop at the opposite end, the oven door shut, and the timer set at zero. This procedure was done as quickly as possible to minimize the time the oven was open. The weighted spliced articles were left in the oven for five minutes. Spliced articles that failed completely resulted in the weight being dropped on the stop switch to mark the time of failure for that sample. After five minutes, any samples that had not failed were removed from the oven and, using the pencil marks as reference points, the slippage between the two pieces of paper was observed with a high power lens and measured to the nearest 0.01 millimeters (mm).

Water-dispersibility. The water-dispersibility of the tape samples was evaluated using the test summarized below, which is generally in accordance with the test method described in PTS-RH: 013/90-14 "Testing of Splice Tape: Identification of Redispersibility in Water", October 1990 (obtained from PTS (The Paper Technology Specialists), Munich, Germany).

A sample of the pressure sensitive adhesive tape, weighing 0.3 grams, was combined with 49.7 grams of blotter paper (Ahlstrom Grade 2400002 White Pulp Test). The paper/tape combination was cut into pieces measuring approximately 1 cm by 1 cm square, and transferred to a disintegrator (a British Pulp Evaluation Apparatus, obtained from Mavis Engineering Limited, London, England). The disintegrator was then filled with room temperature tap water to a total volume of 2000 milliliters (ml) and run for 10 minutes using a rotor speed of 3000 revolutions per minute (rpm). After completion of the disintegrator cycle, the pulp stock was stirred to assure uniformity and then poured into a sheet mold measuring 200 mm by 200 mm (8 inches by 8 inches) (obtained from Williams Apparatus Company, Watertown, N.Y.) and filled with tap water. The sheet mold had been previously fitted on its bottom with a 100 mesh screen. After stirring the stock to provide a uniform dispersion, the water was drained from the sheet mold and the frame of the sheet mold was opened to expose the deposited fiber mat. Two sheets of blotter paper were placed over the top of the mat and rolled down several times with a rolling pin to absorb water. The blotter paper/fibered mat lay-up was then turned over and a third piece of dry blotter paper was placed on the exposed bottom mat surface and rolled down to further absorb water from the lay-up. Next, the lay-up was separated to expose the top mat surface which was then covered with a fourth piece of dry blotter paper. This article was then placed in a hydraulic press and a pressure of 5.5 kilograms/square centimeter was applied to the article for thirty seconds. The pressed article was removed and placed in a sheet drier (Sheet Drier, obtained from Testing Machines Incorporated, Amityville, N.Y.) until dry (about five minutes).

The dried article was separated from the blotter sheets and provide a handsheet. The handsheet was examined under a backlight for transparent spots, which are indicative of non-dispersed adhesive. Four handsheets were prepared and evaluated. The number of spots per sheet and the total number of spots for four sheets were recorded and used to determine a grade using the table below. For any given grade, the requirements of both columns (total spots per sheet and total spots per four sheets) in the Table 1 had to be met.

TABLE 1

Water dispersibility (WD) grade system.

| Grade | Total Number of Spots/Sheet | Total Number of Spots/4 Sheets |
|---|---|---|
| 1 | 0 to 2 | 0 to 2 |
| 2 | 0 to 3 | 3 to 12 |
| 3 | 0 to 5 | 5 to 20 |
| 4 | Greater than 5 | Greater than 5 |

TABLE 2

Materials used in the examples.

| Material | Description | Source |
|---|---|---|
| BA | Butyl acrylate | BASF |
| IOA | Isooctyl acrylate | 3M Company |
| AA | Acrylic Acid | Dow Chemical Co. |
| M-90G | Methoxy polyethylene glycol 400 methacrylate | Shin Nakamura Chemical |
| AM-90G | Methoxy polyethylene glycol 400 acrylate | Shin Nakamura Chemical |
| PPGMA | Polypropylene glycol monomethacrylate | Sartomer |
| BDDA | 1,4-Butanediol diacrylate | Sartomer |
| TMPTA | Trimethylpropane triacrylate | Sartomer |
| DVB | Divinyl benzene HP | Dow Chemical Co |
| NaSS | Sodium styrene sulfonate | Tosoh USA |
| IGEPAL CO987 | Nonylphenol ethoxylate, 70% solids | Rhone-Poulenc |
| TERGITOL 15-S-40 | C12-C14 secondary alcohol ethoxylate, 70% solids | Dow Chemical Co. |
| TWEEN 80 | Polyoxyethylene (20) sorbitan monooleate | Uniqema |
| TEA | Triethanolamine | J. T. Baker |
| QUADROL | N,N,N',N' tetrakis(2-hydroxypropyl) ethylenediamine | Alfa Aesar |
| JAFFAMINE T403 | Polyoxypropylene triamine | Huntsman Corp. |
| POLYCUP 172 | Polyamide-epichlorohydrin | Hercules |
| LUPEROX A-75 | Benzoyl peroxide with 25% water | ATOCHEM |
| IPA | Isopropanol | EM Science |
| KOH | Potassium hydroxide | EM Science |

Microparticle A: Microparticles identified as JPM-8495 were obtained from Sumitomo 3M. The composition of the microparticles was IOA/M-90G/AA/NaSS/BDDA (68.5/20/10/1.5/0.025) (composition reported in parts by weight). EMULGEN 985 was used as the polymerization surfactant.

Various microparticles were prepared using the materials summarized in Table 2. Microparticles B-J were prepared using the same monomer composition: IOA/M-90G/AA/NaSS/BDDA (68.5/20/10/1.5/0.025) (composition reported in parts by weight), except for Microparticle B where monomer M-90G was replaced by AM-90G.

Microparticle B: Igepal CO987 (4.6 grams (g)), NaSS (4.5 g), IOA (206 g), AM-90G (60 g), AA (30 g), BDDA (0.075 g), and Luperox A-75 (1.3 g) were mixed with 660 g of deionized water in a 2000 milliliter plastic beaker with a mechanical stirrer at 500 revolutions per minute (rpm) for three minutes. The mixture was then homogenized with a GIFFORD-WOOD HOMOMIXER at 3000 rpm for eleven minutes. The homogenized dispersion was then poured into a 2-liter resin flask equipped with a thermometer, mechanical stirrer, and nitrogen inlet tube. The reaction mixture was stirred at 300-400 rpm under a nitrogen blanket and heated to 66 degrees Celsius (° C.) and maintained for 14 hours. The resulting composition was cooled and filtered through cheesecloth to give a dispersion of about 32.0% solids and a Brookfield viscosity of 0.34 Pascal seconds (Pa·s).

Microparticle C: Igepal C0987 (6.0 g), NaSS (5.9 g), IOA (268 g), M-90G (78 g), AA (39 g), BDDA (0.1 g), and Luperox A-75 (1.7 g) were mixed with 840 g of deionized water in a 2000-ml plastic beaker with a mechanical stirrer at 500 rpm for three minutes then homogenized with a GIFFORD-WOOD HOMOMIXER at 3000 rpm for ten minutes. The homogenized dispersion was then poured into a 2-liter resin flask equipped with a thermometer, mechanical stirrer, and nitrogen inlet tube. The reaction mixture was stirred at 300-400 rpm under nitrogen blanket, heated to 66° C. and maintained for 14 hours. The resulting composition was cooled and filtered through cheesecloth. Three more identical batches were prepared and combined to yield a dispersion of about 33.4% solids and a Brookfield viscosity of 0.50 Pa·s. Volume-averaged particle size was determined by HORIBA LA-910 Particle Size Analyzer to be 7.9 micrometers (μm).

Microparticle D: Igepal C0987 (4.8 g), NaSS (4.7 g), IOA (214 g), M-90G (62 g), AA (31 g), and BDDA (0.08 g) were mixed with 712 g of deionized water in a 2000-ml plastic beaker with a mechanical stirrer at 500 rpm for three minutes then homogenized with a GIFFORD-WOOD HOMO-MIXER at 4000 rpm for ten minutes. The homogenized dispersion was then poured into a 2-liter resin flask equipped with a thermometer, mechanical stirrer, and nitrogen inlet tube. Luperox A-75 (0.7 g) was added to the dispersion and stirred at 300-400 rpm under nitrogen blanket for 30 minutes. The reaction mixture was then heated to 70° C. for 1 hour followed by 75° C. for 4 hours. The resulting composition was cooled and filtered through cheese cloth to give a dispersion of about 30.3% solids and a Brookfield viscosity of 0.30 Pa·s. Volume-averaged particle size was determined by HORIBA LA-910 Particle Size Analyzer to be 5.4 μm.

TABLE 3

Composition, processing conditions, and properties of Microparticles A-J.

| Micro-particles | Surfactant | homomixer rpm | % Solids | Viscosity (Pa·s) | Particle Size (μm) |
|---|---|---|---|---|---|
| A | Emulgen 985 | N/A | 30.0 | 0.226 | 6.1 |
| B | Igepal CO987 | 3000 | 34.0 | 0.170 | Not measured |
| C | Igepal CO987 | 3000 | 33.4 | 0.500 | 7.9 |
| D | Igepal CO987 | 4000 | 30.3 | 0.300 | 5.4 |
| E | Igepal CO987 | 5000 | 29.5 | 0.370 | 4.7 |
| F | Igepal CO987 | 2000 | 32.9 | 0.220 | 13.0 |
| G | Igepal CO987 | 3000 | 33.3 | 0.540 | 8.3 |
| H | Tergitol 15-S-40 | 4000 | 31.3 | 0.470 | 5.3 |
| I | Tween 80 | 4000 | 30.5 | 1.750 | 5.6 |
| J | Tergitol 15-S-40 | 4000/5000 | 31.0 | 0.750 | 5.0 |

Microparticles E to J: Microparticles E to J were prepared similarly to Microparticle D except that different types of surfactants (on the same solid basis) and different homogenization rates (homomixer rates) were used as specified in Table 3. Also, for Microparticles J, the material was homogenized in the homomixer for ten minutes at 4000 rpm, followed by one minute at 5000 rpm. As shown in Table 3, increasing the homomixer rate decreased the average microparticle size (see Microparticles C-F). Comparing Microparticles D, H, and I, the selection of surfactant did not affect the microparticle size.

The effects of microparticle size were evaluated using adhesive tapes prepared using microparticles A and C-I, as described in Table 3. Adhesives were prepared by mixing a microparticle dispersion with 2.5 grams of TEA inter-crosslinking agent per 30 grams of microparticles, 0.93 g of KOH, and 0.1% by weight of an additional inter-crosslinking agent (i.e., POLYCUP) using a mechanical stirring system at 500 rpm for sufficient time at each step to produce a well-mixed emulsion.

Each adhesive emulsion was coated on a release surface and dried in an oven at 100° C. for five minutes. The dried adhesive coating of 0.038 mm thickness (1.5 mils) was then laminated to a paper backing to provide a single sided construction. Testing was conducted on the single sided construction after removal of the release liner.

The tape samples were tested for Splice Tensile using Paper 1, 300° F. (149° C.) shear (minutes) and slippage (mm), and 90° Peel Adhesion Strength (90° PAS). The results are reported in Table 4.

TABLE 4

Composition and properties of exemplary microparticles.

| Ex. | Particles | Particle size (microns) | Splice Tensile (kN/m) Paper 1 | 300° F. (149° C.) shear and slip (min.) | (mm) | 90° PAS (N/m) |
|---|---|---|---|---|---|---|
| 1 | A | 6.1 | 11.8 | 5+ | 0.00 | 87.9 |
| 2 | C | 7.9 | 9.8 | 5+ | 0.08 | 104.6 |
| 3 | D | 5.4 | 12.3 | 5+ | 0.00 | 134.4 |
| 4 | E | 4.7 | 11.6 | 5+ | 0.15 | 101.4 |
| 5 | F | 13.0 | 7.6 | 5+ | 0.10 | 74.1 |
| 6 | G | 8.3 | 10.5 | 5+ | 0.12 | 87.6 |
| 7 | H | 5.3 | 10.3 | 5+ | 0.08 | 128.6 |
| 8 | I | 5.6 | 11.9 | 5+ | 0.07 | 145.0 |

Adhesive tape samples were prepared using Microparticle D and various levels of a monoamine inter-crosslinking agent (TEA) or a polyamine inter-crosslinking agent (QUADROL), as summarized in Table 5. The adhesives were prepared by mixing the microparticle dispersion with the amine inter-crosslinking agent, KOH, IPA and POLYCUP (an additional inter-crosslinking agent) using a mechanical stirring system at 500 rpm for sufficient time at each step to produce a well-mixed emulsion. All adhesive compositions listed in Table 5 were based on 30 grams of dried polymeric microparticles.

TABLE 5

Adhesive compositions.

| Example ID | Microparticle Dispersion | Amine Type | Amine (g) | KOH (g) | POLYCUP (wt. %) |
|---|---|---|---|---|---|
| CE1 | JPM-8499 | TEA | 2.50 | 0.93 | 0.10% |
| 9 | JPM-8499 | QUADROL | 2.50 | 0.93 | 0.10% |
| CE2 | Microparticle D | TEA | 2.50 | 0.93 | 0.10% |
| 10 | Microparticle D | QUADROL | 2.50 | 0.93 | 0.10% |
| CE3 | Microparticle D | TEA | 3.75 | 0.93 | 0.10% |
| 11 | Microparticle D | QUADROL | 3.75 | 0.93 | 0.10% |
| CE4 | Microparticle D | TEA | 5.00 | 0.93 | 0.10% |
| 12 | Microparticle D | QUADROL | 5.00 | 0.93 | 0.10% |

Examples 9 to 12 and Comparative Examples CE1 to CE4 were evaluated for Splice Tensile to Paper 1 and Paper 2, 300° F. (149° C.) Shear (minutes to failure (min.) and slippage (mm)), Imaging ("IM"), Blocking ("BL"), 90° Peel Adhesion Strength ("90° PAS") and "Water Dispersibility" ("WD"). The results are listed in Table 6.

TABLE 6

Adhesive tape performance.

| Example | Splice Tensile (kN/m) Paper 1 | Paper 2 | 300° F. (149° C.) shear and slip (min.) | (mm) | IM | BL | 90° PAS (N/m) | WD Grade |
|---|---|---|---|---|---|---|---|---|
| CE1 | 12.8 | 9.6 | 5+ | 0.08 | 0 | 0 | 90.5 | 1 |
| 9 | 12.6 | 13.7 | 5+ | 0.05 | 0 | 0 | 95.9 | N/A |
| CE2 | 16.3 | 12.6 | 5+ | 0.06 | 0 | 0 | 124.3 | 1 |
| 10 | 16.8 | 16.6 | 5+ | 0.07 | 0 | 0 | 141.7 | 1 |
| CE3 | 11.4 | 9.5 | 5+ | 0.05 | 0 | 0 | 131.9 | 1 |
| 11 | 17.7 | 18.0 | 5+ | 0.05 | 0 | 0 | 178.8 | 1 |
| CE4 | 10.2 | 6.1 | 5+ | 0.17 | 0 | 0 | 130.8 | 1 |
| 12 | 17.7 | 16.3 | 5+ | 0.10 | 0 | 0 | 197.3 | 1 |

Table 7 summarizes the performance of Example 11 in comparison to commercially available tapes identified by their commercial source of supply and product number. Example 3 was a single-coated tape, while each of the commercially-available products was a double-coated tape. As described in the test methods, the single-coated tapes were tested for splice tensile, using a butt-splice, while the double coated tapes were tested using an overlap splice. Similarly, as described in the test methods, the Imaging and Blocking tests differed slightly for single-versus double-coated tapes. As also described in the test methods, the double-coated tapes were modified and tested as single-coated tapes in the 300° F. (149° C.) Shear test and the 90° Peel Adhesion Strength test.

TABLE 7

Comparison of Example 3 to commercially available tapes.

| Product | Splice Tensile (kN/m) Paper 1 | Paper 2 | 300° F. (149° C.) shear and slip (min.) | (mm) | IM | BL | 90° PAS (N/m) | WD grade |
|---|---|---|---|---|---|---|---|---|
| Example 3 | 17.7 | 18.0 | 5+ | 0.05 | 0 | 0 | 179 | 1 |
| TESA 51912 | 10.9 | 13.2 | 5+ | 0.47 | 6 | 0 | 120 | NA |
| ARCLAD 7051 | 6.2 | 11.8 | 5+ | 0.03 | 0 | 0 | 65 | 2 |
| NITTO 9401 | 15.0 | 13.4 | 5+ | 0.10 | 0 | 0 | 153 | 1 |

TABLE 7-continued

Comparison of Example 3 to commercially available tapes.

| Product | Splice Tensile (kN/m) | | 300° F. (149° C.) shear and slip | | | | 90° PAS (N/m) | WD grade |
|---|---|---|---|---|---|---|---|---|
| | Paper 1 | Paper 2 | (min.) | (mm) | IM | BL | | |
| 3M JP 9917 | 12.1 | 14.1 | 5+ | 0.02 | 0 | 0 | 120 | 1 |
| 3M 9952 | 7.4 | 7.6 | 5+ | 0.03 | 0 | 0 | 120 | 1 |
| 3M 900B | 5.8 | 5.5 | 0.3 | failed | 2 | 2 | 76 | 1 |
| 3M 405 | 13.9 | 23.5 | 5+ | 0.05 | 4 | 0 | 44 | 1 |

Additional exemplary polymeric microparticles were prepared following the procedures described for Microparticle D. For each of the following samples, TERGITOL 15-S-40 was used as the polymerization surfactant. The compositions and properties of the resulting microparticles are summarized in Table 8.

TABLE 8

Composition and properties of exemplary microparticles.

| I.D. | Microparticle composition (parts by weight) | comments | % Solids | Visc. (Pa·s) | Particle Size (μm) |
|---|---|---|---|---|---|
| K | IOA-M90G-AA-NaSS-BDDA (68.5/20/10/1.5/0.025) | Baseline | 33.9 | 3.00 | 4.5 |
| L | IOA-M90G-AA-BDDA (70/20/10/0.025) | No NaSS | 30.3 | Thick paste | N/A |
| M | IOA-M90G-AA-NaSS-BDDA (63.5/20/15/1.5/0.025) | AA (15%) | N/A | Thick paste | N/A |
| N | IOA-M90G-AA-NaSS-BDDA (58.5/20/20/1.5/0.025) | AA (20%) | N/A | Thick paste | N/A |
| P | BA-M90G-AA-NaSS-BDDA (68.5/20/10/1.5/0.025) | BA | 31.8 | 0.03 | 9.6 |
| Q | IOA-M90G-AA-NaSS-DVB (68.5/20/10/1.5/0.031) | DVB | 31.6 | 0.70 | 5.1 |
| R | IOA-M90G-AA-NaSS-TMPTA (68.5/20/10/1.5/0.025) | TMPTA | 31.7 | 2.45 | 5 |
| S | IOA-PPGMA-AA-NaSS-BDDA (68.5/20/10/1.5/0.025) | PPGMA | 29.8 | 0.15 | 9.3 |
| T | IOA-M90G-AA-NaSS-BDDA (63.5/25/10/1.5/0.025) | M90G (25%) | N/A | Thick paste | N/A |
| U | IOA-M90G-AA-NaSS-BDDA (73.5/15/10/1.5/0.025) | M90G (15%) | 32.5 | 1.38 | 4.7 |
| V | IOA-M90G-AA-NaSS-BDDA (78.5/10/10/1.5/0.025) | M90G (10%) | 33.2 | 0.26 | 5.4 |
| W | IOA-M90G-AA-NaSS-BDDA (83.5/5/10/1.5/0.025) | M90G (5%) | 30.4 | 0.21 | 5.9 |
| X | IOA-M90G-AA-NaSS-BDDA (73.5/20/5/1.5/0.025) | AA (5%) | 31.3 | 0.33 | 4.9 |

Adhesive tapes were prepared and tested following the procedures described above except that the additional inter-crosslinking agent (POLYCUP 172) was not included. For each example, 3.75 grams of the multi-amine inter-crosslinking agent was used. The polymeric microparticle-containing adhesives are summarized in Table 9. All adhesive compositions listed in Table 9 were based on 30 grams of dried polymeric microparticles.

TABLE 9

Adhesive compositions.

| Ex. | Dispersion | Comment | Amine Type | KOH (g) |
|---|---|---|---|---|
| 13 | K | | QUADROL | 0.93 |
| 14 | L | No NaSS | QUADROL | 0.93 |
| 15 | P | BA | QUADROL | 0.93 |
| 16 | Q | DVB | QUADROL | 0.93 |
| 17 | R | TMPTA | QUADROL | 0.93 |
| 18 | S | PPGMA | QUADROL | 0.93 |
| 19 | W | M90G (5%) | QUADROL | 0.93 |
| 20 | V | M90G (10%) | QUADROL | 0.93 |
| 21 | U | M90G (15%) | QUADROL | 0.93 |
| 22 | X | AA (5%) | QUADROL | 0.93 |
| 23 | X | AA (5%) | QUADROL | 0.47 |
| 24 | K | Triamine | T403 | 0.93 |

Each sample was tested for Shear Time, Splice Tensile (Paper 1 and Paper 2), 300° F. (149° C.) Shear, Imaging (IM), Blocking (BL), 90° Peel Adhesion Strength (90° PAS), and Water-Dispersibility (WD). The results are summarized in Table 10.

Two adhesive tapes were prepared using microparticles J. Based on 30 grams of microparticles, each adhesive contained 3.75 grams of TEA and 0.93 grams of KOH.

Comparative Example 14 did not include any additional crosslinker, while Example 25 included 0.10% by weight of POLYCUP. These samples were tested for Splice Tensile to Paper 1 and Paper 2, Shear Time (minutes to failure (min.)), 300° F. (149° C.) Shear (minutes to failure (min.) and slippage (mm)), Imaging ("IM"), Blocking ("BL"), and 90° Peel Adhesion Strength ("90° PAS"). The results are summarized in Table 11.

TABLE 10

Adhesive tape performance for Examples 13-24.

| Ex. | Shear Time (min.) | Splice Tensile (kN/m) Paper 1 | Splice Tensile (kN/m) Paper 2 | 300° F. (149° C.) shear slip (min.) | 300° F. (149° C.) shear slip (mm) | IM | BL | 90° PAS (N/m) | WD grade |
|---|---|---|---|---|---|---|---|---|---|
| 13 | 2800+ | 13.3 | 15.9 | 5+ | 0.15 | 0 | 0 | 111.2 | 1 |
| 14 | | | | Not tested (consistency of paste) | | | | | |
| 15 | 2800+ | 10.5 | 12.1 | 5+ | 0.15 | 0 | 0 | 25.1 | 1 |
| 16 | 2800+ | 12.8 | 15.2 | 5+ | 0.10 | 0 | 0 | 111.2 | 1 |
| 17 | 2800+ | 13.1 | 14.9 | 5+ | 0.13 | 0 | 0 | 110.1 | 1 |
| 18 | 2800+ | 10.9 | 14.2 | 5+ | 0.05 | 0 | 0 | 7.6 | 1 |
| 19 | 2800+ | 12.3 | 16.6 | 5+ | 0.10 | 0 | 0 | 21.8 | 1 |
| 20 | 2800+ | 10.9 | 14.9 | 5+ | 0.13 | 0 | 0 | 61.0 | 1 |
| 21 | 2800+ | 13.3 | 15.8 | 5+ | 0.17 | 0 | 0 | 89.4 | 1 |
| 22 | 292 | 7.2 | 6.5 | 5+ | 0.13 | 0 | 0 | 99.2 | 1 |
| 23 | 15 | 9.3 | 8.9 | 5+ | 0.25 | 0 | 1 | 118.8 | 1 |
| 24 | 2800+ | 13.3 | 13.5 | 5+ | 0.13 | 0 | 0 | 76.3 | 1 |

TABLE 11

Adhesive tape performance.

| Ex. | Shear Time (min.) | Splice Tensile (kN/m) Paper 1 | Splice Tensile (kN/m) Paper 2 | 300° F. (149° C.) shear slip (min.) | 300° F. (149° C.) shear slip (mm) | IM | BL | 90° PAS (N/m) |
|---|---|---|---|---|---|---|---|---|
| CE14 | 286 | 10.5 | 9.6 | 5+ | 0.17 | 0 | 0 | 124.3 |
| 25 | 1476 | 10.3 | 9.5 | 5+ | 0.20 | 0 | 0 | 128.6 |

Various modifications and alterations of this invention will become apparent to those skilled in the art without departing from the scope and spirit of this invention.

What is claimed is:

1. A water-based emulsion comprising
   (a) polymeric microparticles comprising the reaction product of a mixture of
      (i) an alkyl (meth)acrylate;
      (ii) a vinyl carboxylic acid;
      (iii) a polyalkylene glycol (meth)acrylate functional oligomer;
      (iv) an ionic monomer; and
      (v) a multi-functional crosslinking monomer;
   (b) a multi-amine inter-crosslinking agent; and
   (c) a neutralizer
dispersed in water.

2. The water-based emulsion of claim 1, wherein the polymeric microparticles have a volume-averaged particle size of 1 to 10 microns.

3. The water-based emulsion of claim 1, further comprising (d) an additional inter-crosslinking agent, wherein the additional inter-crosslinking agent comprises a polyamide-epichlorohydrin copolymer.

4. The water-based emulsion of claim 1, wherein the alkyl (meth)acrylate comprises at least one of isooctyl acrylate and 2-ethyl-hexyl acrylate, and the vinyl carboxylic acid comprises at least one of acrylic acid and methacrylic acid.

5. The water-based emulsion of claim 1, wherein the reaction product further comprises one or more additional copolymerized monomers, wherein at least one of the additional copolymerized monomers is selected from the group consisting of acrylamide, N-vinylpyrrolidone, N-vinylcaprolactam, and a monoester of a (meth)acrylic acid with an alcohol.

6. The water-based emulsion of claim 1, wherein the (meth)acrylate functional oligomer comprises a hydroxy polyalkylene glycol or an alkoxy polyalkylene glycol.

7. The water-based emulsion of claim 1, wherein the multi-functional crosslinking monomer is an alkyl polyol polyacrylate.

8. The water-based emulsion of claim 1, wherein the multi-amine inter-crosslinking agent comprises N,N,N',N'-tetrakis (2-hydroxypropyl)ethylenediamine.

9. The water-based emulsion of claim 1, wherein the multi-amine inter-crosslinking agent comprises a polyoxyalkylene amine.

10. The water-based emulsion of claim 1, wherein the mixture comprises 60% to 80% by weight alkyl (meth)acrylate and 0.01 to 0.05% by weight multi-functional crosslinking monomer.

11. The water-based emulsion of claim 1, wherein the mixture comprises 8% to 12% by weight vinyl carboxylic acid and 10% to 22% by weight polyalkylene glycol (meth)acrylate functional oligomer.

12. The water-based emulsion of claim 1, wherein the emulsion comprises 5 to 20 parts by weight of multi-amine inter-crosslinking agent per 100 parts polymeric microparticles.

13. An adhesive comprising polymeric microparticles inter-crosslinked by a multi-amine inter-crosslinking agent; wherein the polymeric microparticles comprise the reaction product of a mixture of
   (i) an alkyl (meth)acrylate;
   (ii) a vinyl carboxylic acid;
   (iii) a polyalkylene glycol (meth)acrylate functional oligomer;
   (iv) an ionic monomer; and
   (v) a multi-functional crosslinking monomer.

14. The adhesive according to claim 13, wherein the mixture comprises; by weight, 60% to 80% alkyl (meth)acrylate, 8% to 12% vinyl carboxylic acid, 10% to 22% polyalkylene glycol (meth)acrylate functional oligomer, and 0.01 to 0.05% multi-functional crosslinking monomer, and 5 to 0.20 parts by weight of multi-amine inter-crosslinking agent per 100 parts polymeric microparticles.

15. The adhesive according to claim 13, wherein the alkyl group of the alkyl (meth)acrylate contains 4-8 carbon atoms; and the vinyl carboxylic acid comprises at least one of acrylic acid and methacrylic acid.

16. The adhesive according to claim 13, wherein the (meth) acrylate functional oligomer comprises a polyalkylene glycol (meth)acrylate; the multi-functional crosslinking monomer is an alkyl polyol polyacrylate; and the multi-amine inter-crosslinking agent comprises a polyoxyalkylene amine.

17. The adhesive according to claim 13, wherein the adhesive is water-dispersible.

18. A method of forming an adhesive article comprising
(i) coating the water-based emulsion according to claim 1 on a substrate;
(ii) drying the emulsion; and
(iii) inter-crosslinking the polymeric microparticles with the multi-amine inter-crosslinking agent.

19. An adhesive article comprising a substrate and an adhesive according to claim 13 bonded to the substrate.

20. The adhesive article of claim 19, wherein the substrate comprises water-dispersible fibers.

* * * * *

UNITED STATES PATENT AND TRADEMARK OFFICE
CERTIFICATE OF CORRECTION

| | | |
|---|---|---|
| PATENT NO. | : 8,222,333 B2 | Page 1 of 1 |
| APPLICATION NO. | : 12/937480 | |
| DATED | : July 17, 2012 | |
| INVENTOR(S) | : Chi-Ming Tseng | |

It is certified that error appears in the above-identified patent and that said Letters Patent is hereby corrected as shown below:

Column 5
Line 60, after "microparticles", insert -- . --.

Column 8
Line 33, delete "411 ☐L" and insert in place thereof -- 411 DL --.

Column 9
Line 29, delete "panel:" and insert in place thereof -- panel --.

Column 11
Line 45 (Approx.), Table 2, delete "JAFFAMINE" and insert in place thereof -- JEFFAMINE --.

Column 18
Line 58, in claim 14, delete "comprises;" and insert in place thereof -- comprises, --.

Line 61, in claim 14, delete "0.20" and insert in place thereof -- 20 --.

Signed and Sealed this
Thirtieth Day of October, 2012

David J. Kappos
*Director of the United States Patent and Trademark Office*